United States Patent [19]
Moser et al.

[11] Patent Number: 4,923,595
[45] Date of Patent: May 8, 1990

[54] TRIMETALLIC REFORMING CATALYST

[75] Inventors: Mark D. Moser, Elk Grove Village; R. Joe Lawson, Palatine, both of Ill.

[73] Assignee: UOP, Des Plaines, Ill.

[21] Appl. No.: 283,403

[22] Filed: Dec. 12, 1988

Related U.S. Application Data

[63] Continuation-in-part of Ser. No. 65,541, Jun. 23, 1987, Pat. No. 4,791,087, which is a continuation-in-part of Ser. No. 910,099, Sep. 22, 1986, Pat. No. 4,677,094.

[51] Int. Cl.$^5$ .............................................. C10G 35/06
[52] U.S. Cl. .................................................. 208/139
[58] Field of Search ........................................ 208/139

[56] References Cited

U.S. PATENT DOCUMENTS

| | | | |
|---|---|---|---|
| 3,651,167 | 3/1972 | de Rosset | 260/681.5 |
| 3,840,471 | 10/1974 | Acres | 252/432 |
| 3,898,154 | 8/1975 | Rausch | 208/139 |
| 3,909,394 | 9/1975 | Hayes | 208/139 |
| 4,028,223 | 6/1977 | Hayes et al. | 208/139 |
| 4,028,225 | 6/1977 | Wilhelm | 208/139 |
| 4,677,094 | 6/1987 | Moser et al. | 208/139 |
| 4,714,538 | 12/1987 | Moser et al. | 208/139 |
| 4,714,540 | 12/1987 | Moser et al. | 208/139 |

Primary Examiner—Curtis R. Davis
Attorney, Agent, or Firm—Thomas K. McBride; John F. Spears, Jr.

[57] ABSTRACT

A novel trimetallic catalytic composite, a method of manufacture and process use thereof is disclosed. The composite comprises a refractory support having a nominal diameter of at least 650 microns and having deposited thereon a uniformly dispersed platinum component, a uniformly dispersed Group IVA metal component and a surface-impregnated metal or metal-containing component selected from the group consisting of rhodium, ruthenium, cobalt, nickel, or iridium. When this catalytic composite is used in the reforming of hydrocarbons at low pressures, significant improvement in activity stability is observed compared to catalysts of the prior art.

9 Claims, 4 Drawing Sheets

FIG. 5

PHOTOACOUSTIC RECORD (a) Pt/Sn (CONTROL) CATALYST
(b) FRESH Pt/Sn/Co CATALYST
(c) CATALYST (b) OXIDIZED FOR 4 HOURS
(d) CATALYST (b) OXIDIZED FOR 8 HOURS
(e) CATALYST (b) AFTER REGENERATION
(f) COBALT ALUMINATE (DIFFERENT SCALE)

TRIMETALLIC REFORMING CATALYST

CROSS-REFERENCE TO RELATED APPLICATIONS

This application is a continuation-in-part of prior copending application Ser. No. 065,541 filed June 23, 1987, now U.S. Pat. No. 4,791,087, which in turn is a continuation-in-part of application Ser. No. 910,099 filed Sept. 22, 1986, now U.S. Pat. No. 4,677,094, the contents of which are incorporated herein by reference thereto.

BACKGROUND OF THE INVENTION

The subject of the present invention is a novel trimetallic catalytic composite which has exceptional activity and resistance to deactivation when employed in a hydrocarbon conversion process that requires a catalyst having both a hydrogenation-dehydrogenation function and a cracking function. More precisely, the present invention involves a novel dual-function trimetallic catalytic composite which, quite surprisingly, enables substantial improvements in hydrocarbon conversion processes that have traditionally used a dual-function catalyst. In another aspect, the present invention involves improved processes that are produced by the use of the novel catalytic composite, specifically, an improved reforming process which utilizes the subject catalyst to improve activity, selectivity, and stability characteristics.

Composites having a hydrogenation-dehydrogenation function and a cracking function are widely used today as catalysts in many industries such as the petroleum and petrochemical industry to accelerate a wide spectrum of hydrocarbon conversion reactions. Generally, the cracking function is thought to be associated with an acid-acting material of the porous, adsorptive, refractory oxide type which is typically utilized as the support or carrier for a heavy metal component such as the metals or compounds of metals of Groups V through VIII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, desulfurization, cyclization, alkylation, polymerization, cracking, hydroisomerization, etc. In many cases, the commercial applications of these catalysts are in processes where more than one of these reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins and the like reactions to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction which is relatively rich in straight-chain paraffin compounds is contacted with a dual-function catalyst to produce an output stream rich in isoparaffin compounds.

Regardless of the reaction involved or the particular process involved, it is of critical importance that the dual-function catalyst exhibit not only the capability to initially perform its specified functions, but also that it has the capability to perform them satisfactorily for prolonged periods of time. The analytical terms used in the art to measure how well a particular catalyst performs its intended functions in a particular hydrocarbon reaction environment are activity, selectivity and stability. And for purposes of discussion here, these terms are conveniently defined for a given charge stock as follows: (1) activity is a measure of the catalyst's ability to convert hydrocarbon reactants into products at a specified severity level where severity level means the specific reaction conditions used—that is, the temperature, pressure, contact time, and presence of diluents such as $H_2$; (2) selectivity refers to the amount of desired product or products obtained relative to the amount of reactants charged or converted; (3) stability refers to the rate of change with time of the activity and selectivity parameters—obviously, the smaller rate implying the more stable catalyst. In a reforming process, for example, activity commonly refers to the amount of conversion that takes place for a given charge stock at a specified severity level and is typically measured by octane number of the $C_5+$ product stream, selectivity refers to the amount of $C_5+$ yield that is obtained at a particular activity level; and stability is typically equated to the rate of change with time of activity, as measured by octane number of $C_5+$ product, and of selectivity, as measured by $C_5+$ yield. Actually, the last statement is not strictly correct because generally a continuous reforming process is run to produce a constant octane $C_5+$ product with severity level being continuously adjusted to attain this result; and, furthermore, the severity level is for this process usually varied by adjusting the conversion temperature in the reaction zone so that, in point of fact, the rate of change of activity finds response in the rate of change of conversion temperature and changes in this last parameter are customarily taken as indicative of activity stability.

As is well know to those skilled in the art, the principal cause of observed deactivation or instability of a dual-function catalyst when it is used in a hydrocarbon conversion reaction is associated with the fact that coke forms on the surface of the catalyst during the course of the reaction. More specifically, in these hydrocarbon conversion processes, the conditions utilized typically result in the formation of heavy, high molecular weight, black, solid or semi-solid, carbonaceous material which coats the surface of the catalyst and reduces its activity by shielding its active sites from the reactants. In other words, the performance of this dual-function catalyst is sensitive to the presence of carbonaceous deposits on the surface of the catalyst. Accordingly, the major problem facing workers in this area of the art is the development of more active and selective catalyst composites that are not as sensitive to the presence of these carbonaceous materials and/or have the capability to suppress the rate of the formation of these carbonaceous materials on the catalyst. This sensitivity to formation of carbonaceous materials is amplified as practitioners of the art reduce pressure and increase the severity of processing units in an attempt to extract the maximum octane-barrels from a given feedstock. Viewed in terms of performance parameters, the problem is to develop a dual-function catalyst having superior activity, selectivity and stability while operating at pressures less than 862 kPa (ga).

OBJECTS AND EMBODIMENTS

Accordingly, it is an object of the present invention to provide an improved catalyst for reforming of hydrocarbons. A corollary objective is to provide a means of preparing the improved catalyst. It is yet another object to provide an improved catalyst reforming process for improving the anti-knock properties of a gasoline fraction.

Accordingly, in a broad embodiment, the present invention is a catalytic composite for the conversion of hydrocarbons comprising a uniformly dispersed platinum components, a uniformly dispersed Group IVA metal component, a surface-impregnated metal or metal-containing component selected from the group consisting of rhodium, ruthenium, cobalt, nickel, or iridium, and a halogen component on a refractory support having a uniform composition and a nominal diameter of at least about 650 microns.

In a preferred embodiment, the invention is a catalyst composite comprising a uniformly dispersed platinum component, a uniformly dispersed Group IVA metal component, surface-impregnated cobalt as cobalt aluminate, and a halogen component on a refractory support having a uniform composition and a nominal diameter of at least about 650 microns.

In an alternate embodiment, the invention is a method of preparing a catalytic composite comprising compositing a platinum component, a Group IVA metal component, a metal or metal-containing component selected from the group consisting of rhodium, ruthenium, cobalt, nickel or iridium and a halogen component on a refractory support having a uniform composition and a nominal diameter of at least 650 microns such that the platinum and Group IVA metal components are uniformly dispersed and said metal component is surface-impregnated onto said refractory support.

In yet another embodiment, the invention involves a process for the catalytic reforming of a gasoline fraction naphtha to produce a high-octane reformate comprising contacting the gasoline fraction naphtha and hydrogen at reforming conditions with a catalyst composite comprising a uniformly dispersed platinum component, a uniformly dispersed Group IVA metal component, a surface-impregnated metal or metal-containing component selected from the group consisting of rhodium, ruthenium, cobalt, nickel or iridium and a halogen component on a refractory support having uniform composition and a nominal diameter of at least about 650 microns.

These as well as other objects and embodiments will become apparent upon review of the more detailed description of the invention hereinafter set forth.

INFORMATION DISCLOSURE

Several catalyst composites relevant to the composition of the instant invention are disclosed in the art, however, no reference or combination of references discloses the unique combination of components of the instant invention. U.S. Pat. No. 3,651,167 (deRosset) discloses a catalyst composition for the selective hydrogenation of $C_4$-acetylenes utilizing a catalyst comprising a Group VIII noble metal, preferably palladium, deposited on a refractory inorganic oxide carrier material wherein said Group VIII noble metal is surfaceimpregnated. This reference is totally silent to the advantageous use of a surface-impregnated metal in combination with uniformly dispersed platinum and Group IVA metal. Further, it is preferred in this reference that the catalyst be non-acidic, which is in contradistinction to the instant invention where it is essential that a halogen component be included in the catalyst composition. U.S. Pat. No. 3,840,471 (Acres) discloses a catalyst composition containing platinum, rhodium, and a base metal composited on an inert material wherein a Group IVA metal may be chosen as one of a possible 25 base metals disclosed. The intended use of this catalyst is for the oxidation reaction of organic compounds, specifically the oxidation of engine or combustion exhausts. Further, this reference is not even remotely cognizant of the beneficial effect of surfaceimpregnated rhodium.

Of particular interest is the catalyst disclosed in U.S. Pat. No. 3,898,154 (Rausch). This reference discloses a catalyst composite comprising platinum, rhodium, tin, and a halogen on a porous carrier material. The reference, however, teaches that it is an essential feature that the rhodium component may be incorporated by any means known to result in a uniform dispersion thereof in the carrier material. A similar reference, U.S. Pat. No. 3,909,394 (Rausch), discloses a catalytic composite comprising platinum, ruthenium, and a halogen on a porous support. Additionally, it is disclosed that the catalyst may comprise a Group IVA metallic component, with a tin component being specifically disclosed as one of the possible constituents. This reference, however, teaches that it is an essential feature that the components thereof are uniformly distributed throughout the porous carrier material. In particular, it is taught in the reference that the ruthenium component may be incorporated by any means known to result in a uniform dispersion thereof in the carrier material. Accordingly, it can be seen that the reference contemplates the use of ruthenium, platinum, tin, and halogen with a porous support, however, only with the ruthenium uniformly distributed. By way of contrast, it has been discovered in the present invention that an improved catalyst is obtained when a metal or metal-containing component selected from the group consisting of rhodium, ruthenium, cobalt, nickel, or iridium is nonuniformly dispersed, i.e., surfaceimpregnated. Further, as the surprising and unexpected results of the examples presented hereinafter show, a catalyst with a surface-impregnated metal or metal-containing component demonstrates superior performance when compared to a prior art catalyst having the same metal uniformly dispersed.

DETAILED DESCRIPTION OF THE INVENTION

To reiterate briefly, in one embodiment, the present invention is a catalyst composite for the conversion of hydrocarbons comprising a uniformly dispersed platinum component, a uniformly dispersed Group IVA metal component, a surface-impregnated metal component selected from the group consisting of rhodium, ruthenium, cobalt, nickel, or iridium, and a halogen component on a refractory support having a nominal diameter of at least about 650 microns.

Accordingly, considering first the refractory support utilized in the present invention, it is preferred that the material be a porous, adsorptive, high-surface area support having a surface area of about 25 to about 500 $m^2/g$. The porous carrier material should also be uniform in composition and relatively refractory to the conditions utilized in the hydrocarbon conversion process. By the term "uniform in composition", it is meant that the support be unlayered, has no concentration gradients of the species inherent to its composition, and is completely homogeneous in composition. Thus, if the support is a mixture of two or more refractory materials, the relative amounts of these materials will be constant and uniform throughout the entire support. It is intended to include within the scope of the present invention carrier materials which have traditionally been utilized in dual-function hydrocarbon conversion catalysts such as: (1) activated carbon, coke, or charcoal; (2) silica or silica gel, silicon carbide, clays and silicates including those synthetically prepared and naturally occurring, which may or may not be acid treated, for example, attapulgus clay, diatomaceous earth, fuller's earth, kaolin, kieselguhr, etc.; (3) ceramics, porcelain, bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc.; (5) crystalline zeolitic aluminosilicates, such as naturally occurring or synthetically prepared mordenite and/or faujasite, either in the hydrogen form or in a form which has been treated with multivalent cations; and, (6) combinations of one or more elements from one or more of these groups. The preferred porous carrier materials for use in the present invention are refractory inorganic oxides, with best results obtained with an alumina carrier material. Suitable alumina materials are the crystalline aluminas known as the gamma-, eta-, and theta-aluminas, with gamma-alumina giving best results. In addition, in some embodiments, the alumina carrier material may contain minor proportions of other well known refractory inorganic oxides such as silica, zirconia, magnesia, etc.; however, the preferred support is substantially pure gamma-alumina. Preferred carrier materials have an apparent bulk density of about 0.3 to about 0.7 g/cc and surface area characteristics such that the average pore diameter is about 20 to 300 angstroms, the pore volume is about 0.1 to about 1 cc/g. In general, excellent results are typically obtained with a gamma-alumina carrier material which is used in the form of spherical particles having a relatively small diameter (i.e., typically about 1/16-inch), an apparent bulk density of about 0.5 g/cc, a pore volume of about 0.4 cc/g, and a surface area of about 175 m$^2$/g.

The preferred alumina carrier material is uniform in composition and may be prepared in any suitable manner and may be synthetically prepared or natural occurring. Whatever type of alumina is employed, it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide to a salt of aluminum such as aluminum chloride, aluminum nitrate, etc., in an amount to form an aluminum hydroxide gel which, upon drying and calcining, is converted to alumina.

The refractory support may be formed in any desired shape such as spheres, pills, cakes, extrudates, powders, granules, etc. However, it is a feature of the invention that the support be sufficient size such that it has a nominal diameter of at least about 650 microns. By the term "nominal diameter", it is meant the narrowest characteristic dimension. Thus, if the shape of the support is a sphere, the diameter thereof must be at least about 650 microns. Alternatively, if the shape is an extruded cylinder, the diameter of the circular face must be at least 650 microns and the length of the cylinder must be at least 650 microns. Likewise, if the shape of the catalyst is a cube, the length of each side must be at least 650 microns. Typically, the preferred nominal diameter is within the range of from about 400 to about 3200 microns. Best results are obtained when the support has a diameter of about 1500 microns.

For purposes of the present invention, a particularly preferred form of alumina is the sphere; and alumina spheres may be continuously manufactured by the well known oil-drop method which comprises: forming an alumina hydrosol by any of the techniques taught in the art and preferably by reacting aluminum metal with hydrochloric acid; combining the resulting hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging and drying treatments in oil and an ammoniacal solution to further improve their physical characteristics. The resulting aged and gelled particles are then washed and dried at a relatively low temperature of about 149° to about 204° C. and subjected to a calcination procedure at a temperature of about 454° to about 704° C. for a period of about 1 to about 20 hours. This treatment effects conversion of the alumina hydrogel to the corresponding crystalline gammaalumina. See the teachings of U.S. Pat. No. 2,620,314 for additional details.

One essential ingredient of the subject catalyst is the uniformly dispersed platinum component. This platinum component may exist within the final catalyst composite as a compound such as an oxide, sulfide, halide, oxyhalide, etc., in chemical combination with one or more of the other ingredients of the composite or as an elemental metal. Best results are obtained when substantially all of this component is present in the elemental state. Generally, this component may be present in the final catalyst composite in any amount which is catalytically effective but relatively small amounts are preferred. In fact, the platinum component generally will comprise about 0.01 to about 2 wt. % of the final catalyst composite, calculated on an elemental basis. Excellent results are obtained when the catalyst contains about 0.05 to about 1 wt. % of platinum.

This platinum component may be incorporated in the catalyst composite in any suitable manner, such as coprecipitation or cogelation, ion-exchange, or impregnation, provided that a uniform dispersion of the platinum component within the carrier material results. The preferred method of preparing the catalyst involves the utilization of a soluble, decomposable compound of platinum to impregnate the carrier material. For example, this component may be added to the support by commingling the latter with an aqueous solution of chloroplatinic acid. Other water-soluble compounds of platinum may be employed in impregnation solutions and include ammonium chloroplatinate, bromoplatinic acid, platinum dichloride, platinum tetrachloride hydrate, platinum dichlorocarbonyl dichloride, dinitrodiaminoplatinum, etc. The utilization of a platinum chloride compound, such as chloroplatinic acid, is preferred since it facilitates the incorporation of both the platinum component and at least a minor quantity of the halogen component in a single step. Best results are obtained in the preferred impregnation step if the platinum compound yields complex anions containing platinum in acidic aqueous solutions. Hydrogen chloride or the like acid is also generally added to the impregnation solution in order to further facilitate the incorporation of the halogen component and the distribution of the metallic component. In addition, it is generally preferred to impregnate the carrier material after it has been calcined in order to minimize the risk of washing away the valuable platinum compounds; however, in some cases it may be advantageous to impregnate the carrier material when it is in a gelled state.

Yet another essential ingredient of the catalyst of the present invention is the uniformly dispersed Group IVA metal component. This component may be present as an elemental metal, as a chemical compound such as the oxide, sulfide, halide, oxychloride, etc., or as a physical or chemical combination with the porous carrier material and/or other components of the catalytic composite. Of the Group IVA metals, the most preferred are germanium, lead, and tin. The Group IVA metal component is preferably utilized in an amount sufficient to result in a final catalyst composite containing about 0.01 to about 5 wt. % Group IVA metal, calculated on an elemental basis, with best results obtained at a level of about 0.1 to about 2 wt. %. The Group IVA metal component may be incorporated in the catalyst composite in any suitable manner to achieve a uniform dispersion such as by coprecipitation or cogelation with the porous carrier material, ion-exchange with the carrier material or impregnation of the carrier material at any stage in the preparation. It is to be noted that it is intended to include within the scope of the present invention all conventional methods for incorporating a metallic component in a catalyst composite. One preferred method of incorporating the Group IVA metal component into the catalyst composite involves coprecipitating the metal component during the preparation of the preferred refractory oxide carrier material. In the preferred case, this involves the addition of suitable soluble Group IVA metal compounds such as stannous or stannic halide, germanium tetrachloride, lead nitrate, etc. to the alumina hydrosol, and then combining the hydrosol with a suitable gelling agent and dropping the resulting mixture into an oil bath, etc., as explained in detail hereinbefore. Following the calcination step, there is obtained a carrier material having a uniform dispersion of a Group IVA metal oxide in an intimate combination with alumina. Another preferred method of incorporating the Group IVA metal component into the catalyst composite involves the utilization of a soluble, decomposable compound of a Group IVA metal to impregnate and uniformly disperse the Group IVA metal throughout the porous carrier material.

Thus, the Group IVA metal component may be added to the carrier material by commingling the latter with an aqueous solution of a suitable Group IVA metal salt or soluble compound of Group IVA metal such as stannous bromide, stannous chloride, stannic chloride, stannic chloride pentahydrate; or germanium oxide, germanium tetraethoxide, germanium tetrachloride; or lead nitrate, lead acetate, lead chlorate and the like compounds. The utilization of Group IVA metal chloride compounds, such as germanium tetrachloride or lead chlorate is particularly preferred since it facilitates the incorporation of both the Group IVA metal component and at least a minor amount of the preferred halogen component in a single step. In general, the Group IVA metal component can be impregnated either prior to, simultaneously with, or after the other components are added to the carrier material.

Yet another essential feature of the present invention is a surface-impregnated metal or metal-containing component selected from the group consisting of rhodium, ruthenium, cobalt and nickel, or iridium. As heretofore noted, while the prior art has recognized that a platinum-Group IVA metal reforming catalyst may advantageously contain a third metal component, it was believed essential that this metal component is uniformly distributed throughout the catalyst to achieve beneficial results. By way of contrast, it has now been determined that improved performance may be achieved by incorporating a surface-impregnated metal or metal-containing component into a reforming catalyst composite containing uniformly dispersed platinum and Group IVA metal as opposed to the uniformly distributed metal component of the art. It is to be understood that as utilized herein, the term "surface-impregnated" means that at least 80% of the surface-impregnated component is located within the exterior surface of the catalyst particle. The term "exterior surface" is defined as the outermost layer of the catalyst, preferably that which comprises the exterior 50% of the catalyst volume. Expressed in an alternative way, the term "exterior surface" is defined as the exterior 0.2r layer when the catalyst is spherical in shape and 0.3r when the catalyst is cylindrical in shape and the length to diameter ratio of the cylinder is greater than or equal to 2:1. In both of these formulae, "r" is defined as the nominal radius of the support. However, when the shape of the catalyst is such that the determination of the radius is ambiguous (e.g., a cloverleaf shape), then the "exterior surface" is defined as the outermost layer of the catalyst comprising the exterior 50% of the catalyst volume. By "layer", it is meant a stratum of substantially uniform thickness.

A metal or metal-containing component is considered surfaceimpregnated when the average concentration of said metal or metal-containing component within the exterior surface of the catalyst is at least 4 times the average concentration of the same metal or metal-containing component in the remaining interior portion of the catalyst. Alternatively, a metal or metal-containing component is said to be surface-impregnated when the average atomic ratio of the metal or metal-containing component to the uniformly dispersed platinum component is at least 4 times greater in magnitude within the exterior surface of the catalyst than it is within the remaining interior portion.

As previously stated, the surface-impregnated metal is selected from the group consisting of rhodium, ruthenium, cobalt, nickel or iridium. The surface-impregnated metal or metal-containing component may be present in the composite as an elemental metal or in chemical combination with one or more of the other ingredients of the composite, or as a chemical compound of the metal such as the oxide, oxyhalide, sulfide, halide, and the like. The metal or metal-containing component may be utilized in the composite in any amount which is catalytically effective, with the preferred amount being about 0.01 to about 2 wt. % thereof, calculated on an elemental metal basis. Typically, best results are obtained with about 0.05 to about 1 wt. % of surface-impregnated metal. Additionally, it is within the scope of the present invention that beneficial results may be obtained by having more than one of the above-named metals surface-impregnated on the catalyst.

In a preferred embodiment, the surface-impregnated metal is present as a chemical compound of the refractory support. For example, cobalt aluminate may be formed from alumina and surface-impregnated cobalt via oxidation. By way of illustration, without limiting the invention, the oxidation reaction may be summarized as follows:

$$Co + \tfrac{1}{2}O_2 + Al_2O_3 \rightarrow CoAl_2O_4$$

This oxidation may take place during the catalyst preparation procedure, during the calcination or oxidation step as described hereinafter. Additionally, oxidation to form cobalt aluminate may occur during regeneration of the catalyst to restore activity and stability. Regeneration of a catalyst comprising platinum and a Group IV metal component is described in U.S. Pat. No. 3,751,379 (Hayes).

The cobalt aluminate does not substantially revert to cobalt and alumina at conditions which would be encountered in a catalytic reforming unit. Cobalt aluminate on the catalyst can be detected by photoacoustic spectroscopy. The existence of an absorbance peak at 500-650 nm is indicative of the relative proportion of cobalt aluminate present on the catalyst [Gil-Llambias, F. J., Escudey-Castro, A. M., and Santos-Blanco, J., Journal of Catalysis 83, 226-227 (1983); see also Gajardo, P., Grange, P., and Delmon, B., Journal of Catalysis 63, 201-216 (1980); Elbert, E. I. and Tryasunov, B. G., Kinet. Katal. 16, 552 (1975); and Asmolov, G. N. and Kylov, O. V., Kinet. Katal. 12, 463 (1971)].

Catalyst comprising cobalt aluminate displays greater resistance to sulfur deactivation than surface-impregnated cobalt that has not been converted to the aluminate. Following contact with $H_2S$, a catalyst containing surfacedeposited cobalt as aluminate shows a clear advantage in activity, yield, and stability over a catalyst without cobalt. In contrast, a catalyst containing freshly deposited cobalt does not show this relative advantage.

The surface-impregnated component may be incorporated into the catalyst composite in any suitable manner which results in the metal or metalcontaining component being concentrated in the exterior surface of the catalyst support in the preferred manner. In addition, it may be added at any stage of the preparation of the composite—either during preparation of the carrier material or thereafter—and the precise method of incorporation used is not deemed to be critical so long as the resulting metal or metal-containing component is surface-impregnated as the term is used herein. A preferred way of incorporating this component is an impregnation step wherein the porous carrier material containing uniformly dispersed Group IVA metal and platinum is impregnated with a suitable metal-containing aqueous solution. It is also preferred that no "additional" acid compounds are to be added to the impregnation solution. In a particularly preferred method of preparation, the carrier material, containing Group IVA metal and platinum, is subjected to oxidation and halogen stripping procedures, as is explained hereinafter, prior to the impregnation of the surface-impregnated metal or metal-containing components. Aqueous solutions of water soluble, decomposable surface-impregnated metal or metal-containing compounds are preferred, including hexaminerhodium chloride, rhodium carbonylchloride, rhodium trichloride hydrate, ammonium pentachloroaquoruthenate, ruthenium trichloride, nickel chloride, nickel nitrate, cobaltous chloride, cobaltous nitrate, iridium trichloride, iridium tetrachloride and the like compounds.

The catalyst composite of the instant invention is considered by those skilled in the art to be an acidic catalyst. Accordingly, it is essential that the catalyst contain a halogen component which imparts to the composite the necessary acidic function. As hereinabove mentioned, it is preferred that the carrier material containing platinum and Group IVA metal be subjected to oxidation and halogen stripping procedures prior to addition of the surface-impregnated metal component. The presence of excessive amounts of halogen or halide, for example, chloride on the carrier prior to the addition of the surface-impregnated metal, will prevent attainment of the novel surface deposited feature of the instant invention. The oxidation can be carried out at temperatures from about 93° to about 593° C. in an air atmosphere for a period of about 0.5 to about 10 hours in order to convert the metallic components substantially to the oxide form. The stripping procedure is conducted at a temperature of from about 371° to about 593° C. in a flowing air/stream atmosphere for a period of from about 1 to 10 hours. Following addition of the surface-impregnated metal component, the halogen is then added under oxidative conditions to the carrier material. Although the precise form of the chemistry of the association of the halogen component with the carrier material is not entirely known, it is customary in the art to refer to the halogen component as being combined with the carrier material, or with the other ingredients of the catalyst in the form of the halide (e.g., as the chloride). This combined halogen may be fluoride, chloride, iodide, bromide, or mixtures thereof. Of these, fluoride and, particularly, chloride are preferred for the purposes of the present invention. The halogen may be added to the carrier material in any suitable manner after the addition of the surface-impregnated metal component. For example, the halogen may be added as an aqueous solution of a suitable decomposable halogen-containing compound such as hydrogen fluoride, hydrogen chloride, hydrogen bromide, ammonium chloride, etc. For reforming, the halogen will be typically combined with the carrier material in an amount sufficient to result in a final composite that contains about 0.1 to about 3.5 wt. % and preferably about 0.5 to about 1.5 wt. % of halogen calculated on an elemental basis.

Another significant parameter for the present catalyst is the "total metals content" which is defined to be the sum of the platinum component, Group IVA metal component and the surface-impregnated metal component, calculated on an elemental basis. Good results are ordinarily obtained with the subject catalyst when this parameter is fixed at a value of about 0.2 to about 6 wt. %, with best results ordinarily achieved at a metals loading of about 0.3 to about 2 wt. %.

Regardless of the details of how the components of the catalyst are combined with the porous carrier material, the final catalyst generally will be dried at a temperature of about 93° to about 316° C. for a period of from about 2 to about 24 hours or more, and finally calcined or oxidized at a temperature of about 371° to about 593° C. in an air atmosphere for a period of about 0.5 to about 10 hours in order to convert the metallic components substantially to the oxide form. Best results are generally obtained when the halogen content of the catalyst is adjusted during the calcination step by including water and a halogen or a decomposable halogen-containing compound in the air atmosphere utilized. In particular, when the halogen component of the catalyst is chlorine, it is preferred to use a mole ratio of $H_2O$ to HCl of about 5:1 to about 100:1 during at least a portion of the calcination step in order to adjust the final chlorine content of the catalyst to a range of about 0.5 to about 1.5 wt. %.

It is preferred that the resultant calcined catalyst composite be subjected to a substantially water-free reduction step prior to its use in the conversion of hydrocarbons. This step is designed to ensure a uniform and finely divided dispersion of the platinum component throughout the carrier material. Preferably, substantially pure and dry hydrogen (i.e., less than 20 vol. ppm $H_2O$) is used in the reducing agent in this step. The reducing agent is contacted with the calcined catalyst at a temperature of about 427° to about 649° C. and for a period of time of about 0.5 to 10 hours or more, effective to reduce substantially all of the platinum component and the surface-impregnated metal or metal-containing component to the elemental state. However, in the case where the surface-impregnated metal or metal-containing component is nickel or cobalt, then the surface-impregnated metal may be primarily in the oxide form after the reduction step. This reduction treatment may be performed in situ as part of a startup sequence if precautions are taken to predry the plant to a substantially water-free state and if substantially water-free hydrogen is used.

The resulting reduced catalyst composite may, in some cases, be beneficially subjected to a presulfiding operation designed to incorporate in the catalyst composite from about 0.05 to about 0.50 wt. % sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 10° up to about 593° C. or more. It is generally a good practice to perform this presulfiding step operation under substantially water-free conditions.

According to the present invention, a hydrocarbon charge stock and hydrogen are contacted with the trimetallic catalyst described above in a hydrocarbon conversion zone. This contacting may be accomplished by using the catalyst in a fixed bed system, a moving bed system, a fluidized bed system, or in a batch type operation. In the fixed bed system, a hydrogen-rich gas and the charge stock are preheated by an suitable heating means to the desired reaction temperature and then are passed into a conversion zone containing a fixed bed of the catalyst type previously characterized. It is, of course, understood that the conversion zone may be one or more separate reactors with suitable means therebetween to ensure that the desired conversion temperature is maintained at the entrance to each reactor. It is also important to note that the reactants may be contacted with the catalyst bed in either upward, downward, or radial flow fashion with the latter being preferred. In addition, the reactants may be in the liquid phase, a mixed liquid-vapor phase, or a vapor phase when they contact the catalyst, with best results obtained in the vapor phase.

In the case where the catalyst of the present invention is used in a reforming operation, the reforming system will comprise a reforming zone containing a fixed or moving bed of the catalyst types previously characterized. This reforming zone may be one or more separate reactors with suitable heating means therebetween to compensate for the endothermic nature of the reactions that take place in each catalyst bed. The hydrocarbon feed stream that is charged to this reforming system will comprise hydrocarbon fractions containing naphthenes and paraffins that boil within the gasoline range. The preferred charge stocks are naphthas, those consisting essentially of naphthenes and paraffins, although in many cases aromatics will also be present. This preferred class includes straight run gasolines, natural gasolines, synthetic gasolines, and the like. On the other hand, it is frequently advantageous to charge thermally or catalytically cracked gasolines or higher boiling fractions thereof. Mixtures of straight run and cracked gasoline range naphthas can also be used to advantage. The gasoline range naphtha charge stock may be a full boiling gasoline having an initial boiling point of from about 10° to about 66° C. and an end boiling point within the range of from about 163° to about 218° C., or may be a selected fraction thereof which generally will be a higher boiling fraction commonly referred to as a heavy naphtha—for example, a naphtha boiling in the range of $C_7$ to 204° C. In some cases, it is also advantageous to charge pure hydrocarbon distillates—for example, straight-chain paraffins—which are to be converted to aromatics. It is preferred that these charge stocks to be treated by conventional catalytic pretreatment methods such as hydrorefining, hydrotreating, hydrodesulfurization, etc., to remove substantially all sulfurous, nitrogenous and water-yielding contaminants therefrom, and to saturate any olefins that may be contained therein.

In a reforming embodiment, it is generally a preferred practice to use the present catalytic composite in a substantially water-free environment. Essential to the achievement of this condition in the reforming zone is the control of the amount of water and water-producing compounds present in the charge stock and the hydrogen stream which are being charged to the zone. Best results are ordinarily obtained when the total amount of water entering the conversion zone from any source is held to a level substantially less than 50 ppm, and preferably less than 20 ppm, expressed as weight of equivalent water in the charge stock. In general, this can be accomplished by an appropriate pretreatment of the charge stock coupled with the careful control of the water present in the charge stock and in the hydrogen stream; the charge stock can be dried by using any suitable drying means known to the art such as a conventional solid adsorbent having a high selectivity for water, for instance, sodium or calcium crystalline aluminosilicates, silica, gel, activated alumina, molecular sieves, anhydrous calcium sulfate, high surface area sodium and the like adsorbents. Similarly, the water content of the charge stock may be adjusted by suitable stripping operations in a fractionation column or like device. And in some cases, a combination of adsorbent drying and distillation drying may be used advantageously to effect almost complete removal of water from the charge stock. Preferably, the charge stock is dried to a level corresponding to less than 20 ppm of $H_2O$ equivalent. In general, it is preferred to control the water content of the hydrogen stream entering the hydrocarbon conversion zone within a level of about 5 to 20 vol. ppm of water or less.

In the reforming embodiment, an effluent stream is withdrawn from the reforming zone and passed through a cooling means to a separation zone, typically maintained at about $-4°$ to $66°$ C., wherein a hydrogen-rich gas is separated from a high octane liquid product, commonly called an "unstabilized" reformate. When the water content of the hydrogen-rich gas is greater than desired, a portion of this hydrogen-rich gas is withdrawn from the separating zone and passed through an adsorption zone containing an adsorbent selective for water. The resultant substantially water-free hydrogen stream is then recycled through suitable compressing means back to the reforming zone. If the water content of the hydrogen-rich gas is within the range specified, then a substantial portion of it can be directly recycled to the reforming zone, the liquid phase from the separating zone is typically withdrawn and commonly treated in a fractionating system in order to adjust the butane concentration, thereby controlling front-end volatility of the resulting reformate.

The conditions utilized for the reforming embodiment of the present invention include a pressure selected from the range of about 101 to about 6995 kPa, with the preferred pressure being about 446 to about 2514 kPa. Particularly good results are obtained at low pressure, namely, a pressure of about 446 to 791 kPa. In fact, it is a singular advantage of the present invention that it allows stable operation at lower pressures than have heretofore been successfully utilized in so-called "continuous" reforming systems with a bimetallic catalyst (i.e., reforming for periods of about 0.5 to about 5 or more barrels of charge per pound of catalyst without regeneration). In other words, the catalyst of the present invention allows the operation of a continuous reforming system to be conducted at lower pressure, i.e. about 345 kPa (ga), for about the same or better catalyst life before regeneration as has been heretofore realized with conventional bimetallic catalysts at higher pressures, i.e. 862 kPa (ga).

Similarly, the temperature required for reforming with the subject catalyst is generally lower than that required for a similar reforming operation using a high quality bimetallic platinum catalyst of the prior art. This significant and desirable feature of the present invention is a consequence of the selectivity of the catalyst of the present invention for the octane-upgrading reactions that are preferably induced in a typical reforming operation. Hence, reforming conditions include a temperature in the range of from about $427°$ to about $593°$ C. and preferably about $482°$ to about $566°$ C. As is well known to those skilled in the continuous reforming art, the initial selection of the temperature within this broad range is made primarily as a function of the desired octane of the product reformate considering the characteristics of the charge stock and the catalyst. Ordinarily, the temperature then is thereafter slowly increased during the run to compensate for the inevitable deactivation that occurs to provide a constant octane product.

It is a feature of the present invention that the rate at which the temperature is increased in order to maintain a constant octane product is substantially lower for the catalyst of the present invention. Moreover, for the catalyst of the present invention, the $C_5^+$ yield loss for a given temperature increase is substantially lower than for a high quality bimetallic reforming catalyst of the prior art. In addition, hydrogen production is substantially higher.

The reforming conditions of the present invention also include sufficient hydrogen to provide an amount of about 1 to 20 moles of hydrogen per mole of hydrocarbon entering the reforming zone, with excellent results being obtained when about 5 to about 10 moles of hydrogen are used per mole of hydrocarbon. The liquid hourly space velocity (LHSV) included in the reforming conditions employed in the invention is selected from the range of about 0.1 to about 10 $hr^{-1}$ with a value in the range of about 1 to about 5 $hr^{-1}$ being preferred. In fact, the present invention allows operations to be conducted at a higher LHSV than normally can be stably achieved in a continuous reforming process with a high quality bimetallic platinum reforming catalyst of the prior art. This last feature is of immense economic significance because it allows a continuous reforming process to operate at the same throughput level with less catalyst inventory than that heretofore used with conventional reforming catalysts at no sacrifice in catalyst life before regeneration.

The following working examples are given to illustrate further the preparation of the catalytic composite of the present invention and the use thereof in the conversion of hydrocarbons. It is understood that the examples are intended to be illustrative rather than restrictive.

EXAMPLE I

This example sets forth a preferred method of preparing the catalytic composite of the present invention. A tin-containing alumina sphere was prepared by cogelling an alumina hydrosol containing a soluble compound of tin by the oil-drop method. After oil-dropping and aging, the cogelled spheres were dried and calcined. The resulting particles comprised uniformly distributed tin oxide and alumina in the shape of spheres having an approximate diameter of 1500 microns.

An aqueous impregnation solution containing chloroplatinic acid and hydrogen chloride was then prepared. This solution contained hydrogen chloride in an amount corresponding to about 2 wt. % of the carrier material to be impregnated. The amount of hydrogen chloride utilized in the impregnation solution was selected to assure good dispersion of platinum throughout the catalyst particle.

The amount of platinum component in the impregnation solution utilized to make the catalyst of the present invention was sufficient to result in a finished catalyst composite containing 0.375 wt. % platinum. After impregnation, the catalyst was dried and calcined. After calcination, the catalyst was subjected to a chloride stripping procedure to remove any excess chloride ions that would have a deleterious effect on the subsequent rhodium impregnation. As heretofore mentioned, the presence of excess chloride ions would cause the rhodium to be uniformly distributed throughout the carrier material and not remain in the external 300 micron layer as is essential in the instant invention. The stripping procedure was conducted at a temperature of about 527° C. by passing a flowing air/stream mixture across the catalyst composite for approximately 2 hours.

The resulting composite was next contacted with a rhodium-containing aqueous solution prepared by adding rhodium trichloride hydrate to water in an amount sufficient to result in a composite containing 0.05 wt. % rhodium.

After the rhodium impregnation, the catalyst was again dried and calcined. After calcination the catalyst was subjected to a chlorination step to add the halogen component. After chlorination, the catalyst was reduced in a dry hydrogen stream for about 1 hour.

Figure 1:
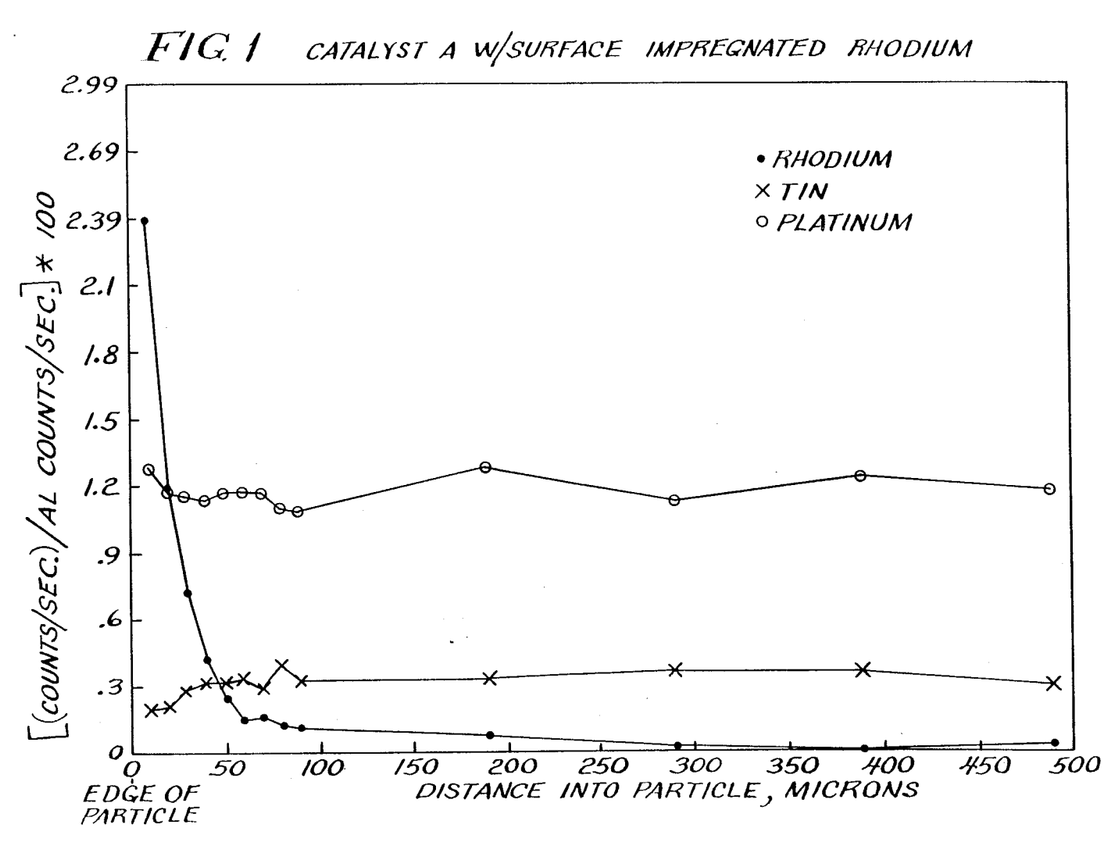
FIG. 1 is a graphical depiction of Catalyst A, made in accordance with the invention, comparing the distribution profiles of platinum and tin being uniformly dispersed to rhodium being nonuniformly dispersed through the catalyst particle of the present invention.

The resulting catalyst particles were analyzed and found to contain, on an elemental basis, about 0.375 wt. % platinum, about 0.05 wt. % rhodium, about 0.3 wt. % tin and about 1.05 wt. % chlorine. This catalyst was designated Catalyst A. In order to determine whether the rhodium component was surfaceimpregnated Catalyst A was subjected to an electron microprobe distribution analysis. The results of this analysis are set forth in FIG. 1. As can be noted, FIG. 1 is a normalized ratio of rhodium to aluminum as a function of the distance from the sphere edge in microns. The graph indicates that there is no rhodium beyond a depth of about 150 microns from the sphere edge. Accordingly, it can be seen that Catalyst A comprises a surface-impregnated rhodium component.

EXAMPLE II

In this example, a catalyst was made in a fashion such that the rhodium component was uniformly dispersed throughout the catalyst particle. The resulting catalyst represents the catalyst compositions of the prior art. The important differences between the procedures used to make the prior art catalyst and Catalyst A are that the prior art procedure utilizes a co-impregnation of platinum and rhodium and does not employ a chloride stripping procedure. Accordingly, the catalyst of this example was prepared by starting with the same tin-containing alumina as in Catalyst A. A sulfur-free aqueous solution containing chloroplatinic acid, rhodium trichloride hydrate, and hydrogen chloride was then prepared. Similarly, this solution contained hydrogen chloride in an amount corresponding to about 2 wt. % of the carrier material to be impregnated. The amount of metallic components in the impregnation solution utilized to make the catalyst was sufficient to result in a final composite containing 0.375 wt. % platinum and 0.05 wt. % rhodium. After impregnation, the catalyst was dried and calcined in the same manner as Catalyst A. After calcination, the catalyst was similarly subjected to a chlorination step to add the halogen component. After chlorination, the catalyst was reduced in a dry hydrogen stream for about 1 hour. The final catalyst composite comprised, on an elemental basis, about 0.375 wt. % platinum, about 0.05 wt. % rhodium, about 0.3 wt. % tin, and about 1.05 wt. % chlorine. The catalyst was designated Catalyst B.

Figure 2:
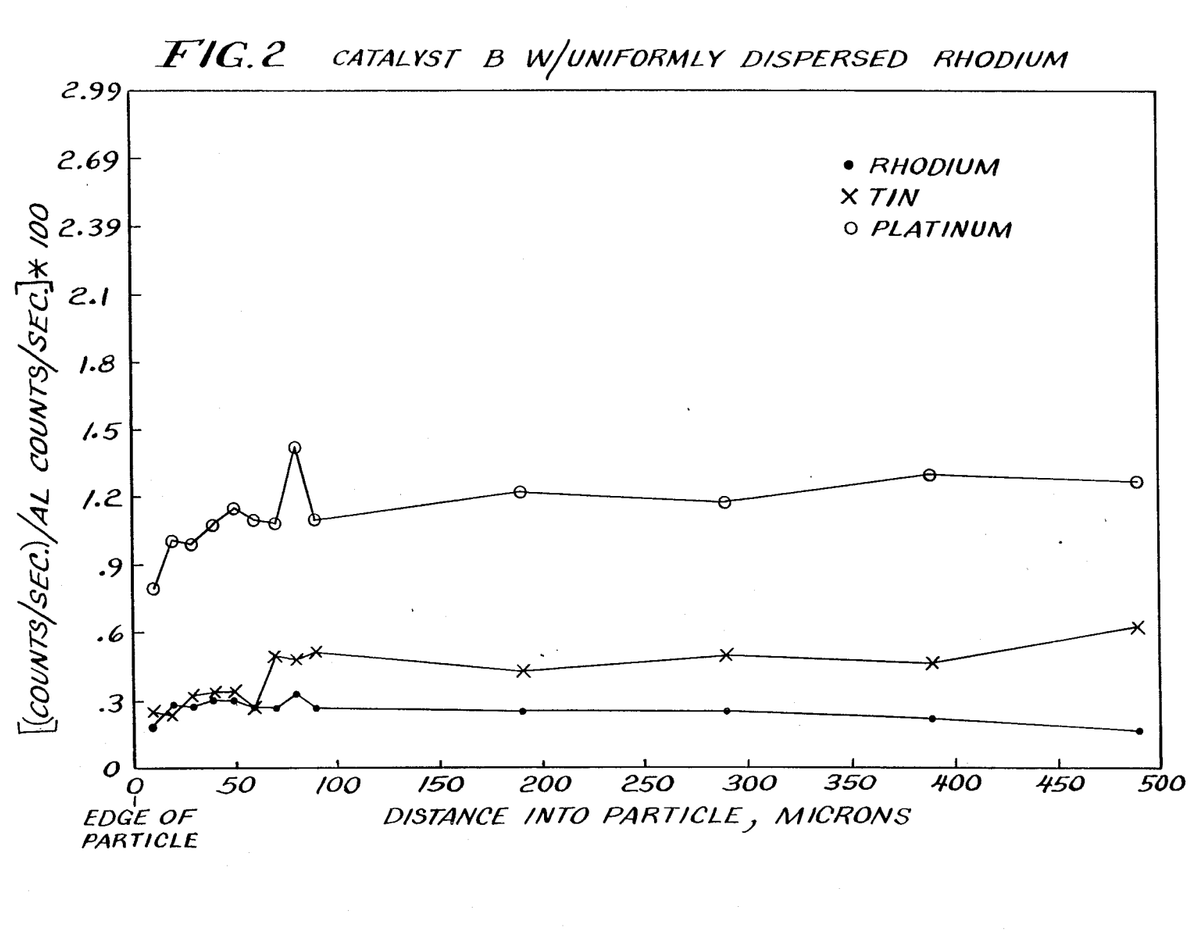
FIG. 2 is a graphical depiction of Catalyst B, not of the instant invention, showing the distribution profiles of platinum, tin and rhodium, all being uniformly dispersed through a catalyst particle of the prior art.

In order to determine the rhodium distribution in Catalyst B, Catalyst B was subjected to an electron microprobe distribution analysis. The results of this analysis are set forth in FIG. 2. FIG. 2 is a graph of the ratio of the counts of rhodium at a given distance from the sphere edge divided by the counts of aluminum detected by the microprobe scan. The data in FIG. 2 clearly reveals that substantial amounts of rhodium are dispersed in the catalyst at a depth greater than 150 microns, and, in fact, rhodium is uniformly dispersed throughout the catalyst. Accordingly, the rhodium component of Catalyst B is not surface-impregnated.

EXAMPLE III

In order to compare Catalyst A, a composite made in accordance with the invention, with Catalyst B, a catalyst not having a surface-impregnated rhodium component, both catalysts were separately subjected to a high stress evaluation test designed to determine the relative activity and selectivity for the reforming of a gasoline charge stock. In all tests, the same charge stock was utilized, its characteristics are given in the Table I below.

TABLE I

| PROPERTIES OF PLATEAU UINTA BASIN NAPHTHA | |
|---|---|
| IBP, °C. | 80 |
| 50% | 121 |
| EP | 199 |
| Paraffins, vol. % | 66 |
| Naphthenes, vol. % | 24 |
| Olefins, vol. % | — |
| Aromatics, vol. % | 10 |
| API | 58.7 |
| Sulfur | <0.5 wt. ppm |
| $H_2O$ | 10 wt. ppm |
| Cl | 1 wt. ppm |
| Nitrogen | <13 wt. ppm |

The tests were performed in a laboratory scale reforming plant comprising a reactor containing a catalyst undergoing evaluation, a hydrogen separating zone, a debutanizer column, suitable heating, pumping, and condensing means, etc.

In this plant, a hydrogen recycle stream and a charge stock are commingled and heated to the desired conversion temperature. The resulting mixture is then passed downflow into a reactor containing the catalyst being tested as a fixed bed. An effluent stream is then withdrawn from the bottom of the reactor, cooled to about 0° C. and passed to the separating zone wherein a hydrogen-rich gaseous phase separates from a liquid phase. The hydrogen-rich gaseous phase is then withdrawn from the separating zone and a portion of it is continually passed through a high surface area sodium scrubber. The resulting substantially water-free hydrogen stream is then recycled to the reactor in order to supply hydrogen for the reaction. The excess hydrogen over that needed for recycle is recovered as excess separator gas. Moreover, the liquid phase from the separating zone is withdrawn therefrom and passed to the debutanizer column wherein light ends are taken overhead as debutanizer gas and a $C_5+$ reformate stream recovered as bottoms.

The conditions utilized in both tests were a reaction zone outlet pressure of about 345 kPa (ga), a 5.0 molar ratio of hydrogen-rich vapor to hydrocarbon charge stock, and a 2.0 liquid hourly space velocity. Reaction zone temperatures were selected to achieve a hydrocarbon product reformate of 102 research octane number. The results of testing of Catalysts A and B are set forth in FIGS. 3 and 4.

Figure 3:
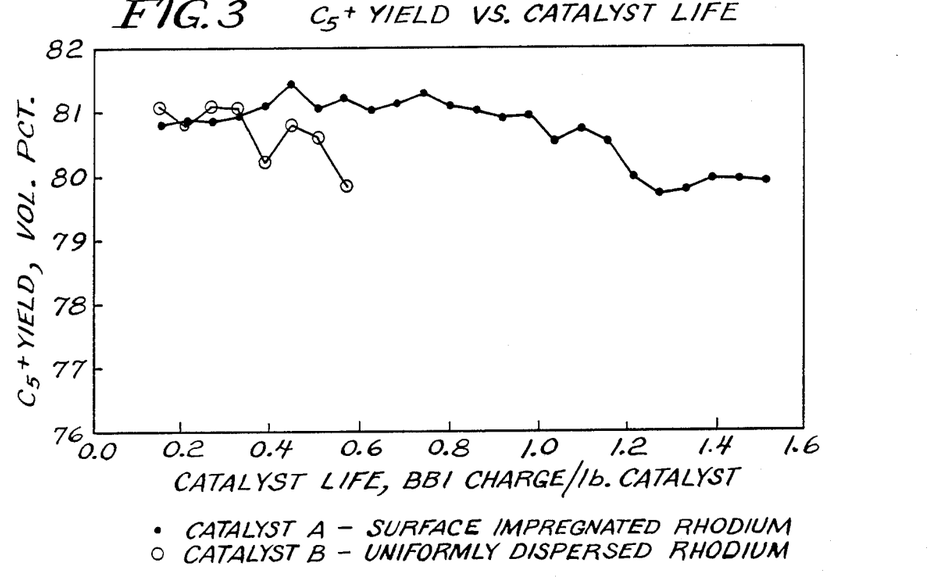
FIG. 3 is a graphical depiction of catalyst selectivity as measured by the $C_5^+$ reformate volume percent yield as a function of catalyst life measured in barrels of charge stock processed per pound of catalyst. Performance data for both Catalyst A and Catalyst B are shown.
Figure 4:
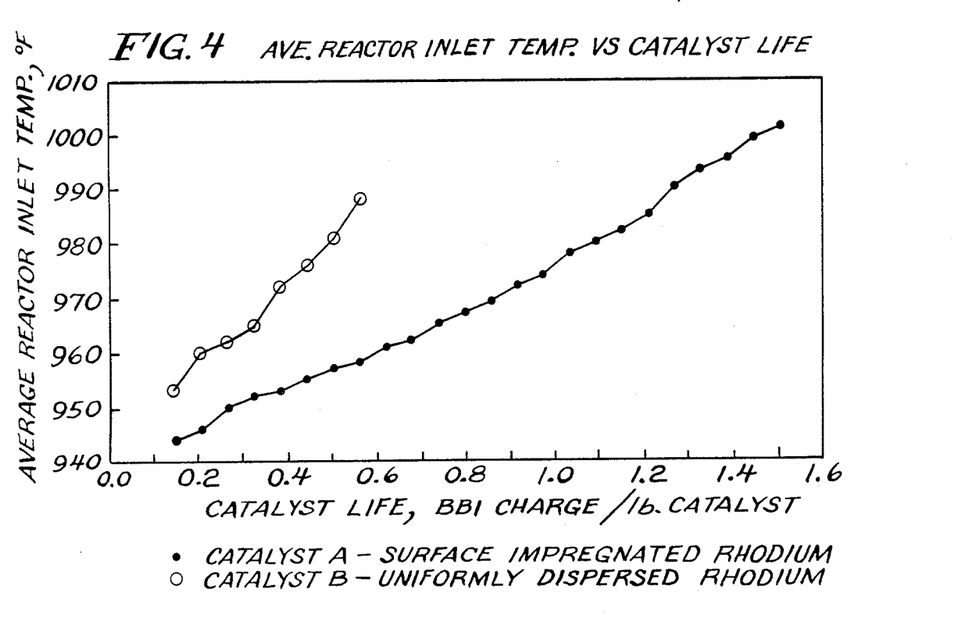
FIG. 4 is a graphical depiction of catalyst activity as measured by average reaction zone temperature necessary to provide a reformate of 102 research octane number as a function of catalyst life measured in barrels of charge stock processed per pound of catalyst. Again, performance data for both Catalyst A and Catalyst B are shown.

FIG. 3 is a graphical depiction of the $C_5+$ liquid volume percent yield, based on the volume of hydrocarbon charge stock, as a function of catalyst life as measured by the barrels of charge stock processed per pound of catalyst. Surprisingly and unexpectedly, Catalyst A, containing a surface-impregnated rhodium component consistently exhibits a higher $C_5+$ liquid volume percent yield of 102 research octane number reformate. Accordingly, Catalyst A exhibits improved selectivity for the production of 102 research octane number reformate relative to Catalyst B. FIG. 4 is a graphical depiction of the average reactor inlet temperature necessary to achieve a reformate of 102 research octane number as a function of catalyst life defined as barrels of charge stock processed per pound of catalyst. Using the average inlet temperature as a measure of catalyst activity, it can be seen that surprisingly and unexpectedly Catalyst A, having a surface-impregnated rhodium component, exhibits a higher activity (lower average reactor inlet temperature) than is exhibited by Catalyst B. More importantly, Catalyst A exhibits greater activity stability as measured by the slope of the average reactor inlet temperature line. Thus, comparing the performance of the two catalysts at a given end-in-run temperature, for example, 532° C., shows that Catalyst A processed 124% more charge stock than did Catalyst B. In other words, Catalyst had more than twice the stability as that of Catalyst B. Accordingly, Catalyst B showed much greater loss of activity as measured by the respective slopes of the inlet temperature lifelines.

EXAMPLE IV

The catalyst described in this example represents another catalyst composite of the present invention. An oxidized, chloride-stripped spherical catalyst particle containing platinum and tin uniformly dispersed on an alumina support was prepared by following the procedure outlines in Example I. An impregnation solution containing ammonium pentachloraquoruthenate and water was contacted with the platinum and tin containing spherical particles in a manner to result in a composite containing 0.5 wt. & surface-impregnated ruthenium. After the ruthenium impregnation, the catalyst was dried and calcined. After calcination, the composite was subjected to a chlorination step to add the halogen component. After chlorination, the catalyst was reduced in a dry hydrogen stream for about 1 hour.

The resulting catalyst particles were found to contain, on an elemental basis, about 0.375 wt. % uniformly dispersed platinum, about 0.5 wt. % surface-impregnated ruthenium, about 0.3 wt. % uniformly dispersed tin and about 1.05 wt. % chlorine. This catalyst was designated as Catalyst C.

EXAMPLE V

To illustrate clearly the benefits of surface-impregnated rhtuenium, a catalyst composite with uniformly dispersed ruthenium was prepared for comparison. In making this uniformly dispersed ruthenium-containing catalyst, a uniformly dispersed tin containing alumina support, identical to that used for preparing Catalyst C was contacted with an impregnation solution containing chloroplatinic acid, ruthenium trichloride, and 12 wt. % hydrogen chloride based on the weight of the carrier material. This high acid solution was selected to assure a uniform dispersion of both the platinum and ruthenium. The drying, calcining, and halogen addition steps are identical to that used for Catalyst C. Accordingly, this catalyst was made in accordance with the teachings of U.S. Pat. No. 3,909,394. The final catalyst composite comprised, on an elemental basis, about 0.375 wt. % uniformly dispersed platinum, about 0.5 wt. % uniformly dispersed ruthenium, about 0.3 wt. % uniformly dispersed tin, and about 1.05 wt. % chlorine. This catalyst was designated Catalyst D.

EXAMPLE VI

In order to compare Catalyst C, a composite made in accordance with the invention with Catalyst D, a catalyst not having a surface-impregnated metal component, both catalysts were tested following the procedure outlined in Example III.

The performance results are presented in Table II. It is observed that, at the completion of a 25° C. temperature cycle, Catalyst C produces slightly higher $C_5+$ liquid volume percent yield of 102 research octane number reformate than does the uniformly dispersed ruthenium catalyst. More importantly, Catalyst C, having surface-impregnated ruthenium, is much more activity stable as evidenced by the lower ratio of temperature to barrels of feed processed per pound of catalyst loaded and is capable of processing about 30% more feed than Catalyst B for the same temperature cycle. In other words, the uniformly dispersed ruthenium catalyst, Catalyst D, deactivated about 35% faster than the catalyst composite of the instant invention.

TABLE II

| Catalyst<br>Ru Impregnation | C<br>Surface | D<br>Uniform |
|---|---|---|
| Start-of-run temp. @ 0.3 BPP, °F. | 960 | 964 |
| Avg. $C_5$ + liq. vol. % yield | 79.3 | 79.1 |
| Deactivation Rate, °F./BPP | 35.7 | 48.4 |

EXAMPLE VII

The catalyst described in this example represents another catalyst composite of the instant invention. An oxidized, chloride-stripped spherical catalyst particle containing platinum and tin uniformly dispersed on an alumina support was prepared following the procedure outlined in Example I. An impregnation solution containing nickel nitrate and isopropanol was contacted with the platinum and tin containing spherical particles in a manner to result in a composite containing 0.36 wt. % surface-impregnated nickel. After the nickel impregnation, the catalyst was dried and calcined. After calcination, the catalyst was subjected to a chlorination step to add the halogen component. After chlorination, the catalyst was reduced in a dry hydrogen stream for about 1 hour.

The resulting catalyst particles were found to contain 0.387 wt. % uniformly dispersed platinum, 0.36 wt. % surface-impregnated nickel, 0.3 wt. % uniformly dispersed tin and 1.05 wt. % chlorine. This catalyst was designated as Catalyst E.

EXAMPLE VIII

To illustrate the advantages of having surface-impregnated nickel, a catalyst composite was prepared for comparison wherein the nickel was uniformly dispersed throughout the catalyst composite. In preparation of the uniformly dispersed nickel containing catalyst, a uniformly dispersed tin containing alumina support, identical to that used for preparing Catalyst E, was contacted with an impregnation solution containing chloroplatinic acid, nickel nitrate, and 2 wt. % hydrogen chloride based on the weight of the alumina carrier material. This hydrogen chloride level was selected to allow for uniform dispersion of both the platinum and nickel metals. The drying, calcining, and halogen addition steps were identical to that used for Catalyst E. The final catalyst composite comprised, on an elemental basis, 0.39 wt. % uniformly dispersed platinum, 0.36 wt. % uniformly dispersed nickel, 0.3 wt. % uniformly dispersed tin, and 1.14 wt. % chlorine. This catalyst was designated Catalyst F.

EXAMPLE IX

The catalyst described in this example represents another catalyst composite of the instant invention. An oxidized, chloride-stripped spherical catalyst particle containing platinum and tin uniformly dispersed on an alumina support was prepared following the procedure outlined in Example I. An impregnation solution containing cobaltous chloride and isopropanol was contacted with the platinum and tin containing spherical particles in a manner to result in a composite containing 0.42 wt. % surface-impregnated cobalt. After the cobalt impregnation, the catalyst was subjected to the identical finishing conditions as those used in Example VII.

The resulting catalyst particles were found to contain 0.384 wt. % uniformly dispersed platinum, 0.42 wt. % surface-impregnated cobalt, 0.3 wt. % uniformly dispersed tin and 1.03 wt. % chlorine. This catalyst was designated Catalyst G.

EXAMPLE X

Catalysts E, F, and G were performance tested in the identical manner as set forth in Example III. Tables III and IV present the results. Comparing Catalyst E to Catalyst F, as listed in Table III, shows that the surface-impregnated nickel catalyst surprisingly and unexpectedly exhibited an average 1.1 greater $C_5+$ liquid volume percent yield of 102 research octane number reformate compared to Catalyst F having uniformly dispersed nickel. More importantly, the surface-impregnated catalyst deactivates at a much lower rate than the uniformly dispersed nickel catalyst, resulting in an activity stability improvement of 48%. This stability improvement allows for 56% more feedstock to be processed in a given 17° C. temperature cycle by the catalyst of the instant invention compared to the uniformly dispersed nickel containing catalyst.

Test results for Catalyst G, shown in Table IV, similarly illustrate exceptional performance, thus demonstrating the surprising benefit realized when surface-impregnated cobalt is employed with uniformly dispersed platinum and tin.

TABLE III

| Catalyst<br>Ni Impregnation | E<br>Surface | F<br>Uniform |
|---|---|---|
| Start-of-run temp. @ 0.3 BPP, °F. | 955 | 958 |
| Avg. $C_5+$ liq. vol. % yield | 80.4 | 79.3 |
| Deactivation Rate, °F./BPP | 28.5 | 42.9 |

TABLE IV

| Catalyst<br>Co Impregnation | G<br>Surface |
|---|---|
| Start-of-run temp. @ 0.3 BPP, °F. | 948 |
| Avg. $C_5+$ liq. vol. % yield | 80.6 |
| Deactivation Rate, °F./BPP | 17.6 |

EXAMPLE XI

This example presents data for a catalyst composite of the instant invention wherein platinum and germanium are uniformly dispersed throughout the composite and ruthenium is surface-impregnated. This catalyst was designated as Catalyst H and contained 0.375 wt. % platinum, 0.25 wt. % germanium, and 0.5 wt. % of surface-impregnated ruthenium.

Catalyst H was prepared by impregnating a spherical alumina support, prepared by the oil drop method, with platinum, germanium, and ruthenium in an aqueous solution containing 2 wt. % hydrochloric acid, based on the weight of the alumina support. The impregnated composite was subjected to the same oxidation and reduction procedures as those described in Example VII.

Catalyst H was evaluated in a pilot plant test following the same test procedure as described in Example III. Test results are presented in Table V.

TABLE V

| Catalyst<br>Ru Impregnation | H<br>Surface |
|---|---|
| Start-of-run temp. @ 0.3 BPP, °F. | 965 |
| Avg. $C_5+$ liq. vol. % yield | 79.8 |
| Deactivation Rate, °F./BPP | 64 |

EXAMPLE XII

This example presents a method of preparing a catalyst of the instant invention comprising uniformly dispersed platinum, uniformly dispersed lead, and surface-deposited rhodium. The preparation procedure would follow identically the procedure set forth in Example I except that lead nitrate would be substituted for the soluble tin compound. By adjusting the quantities of lead nitrate, chloroplatinic acid, and rhodium trichloride, a catalyst could be prepared containing about 0.38 wt. % platinum, 0.05 wt. % rhodium, about 0.3 wt. % lead, and about 1.0 wt. % chlorine. This catalyst composite could adequately be employed for the reforming of hydrocarbons.

In summary, it can be seen from the above performance test results that by incorporating a surface-impregnated metal component in accordance with the invention, a superior and improved reforming catalyst is thereby achieved.

EXAMPLE XIII

An additional catalyst of the present invention was prepared containing surface-impregnated cobalt. An oxidized, chloride-stripped spherical catalyst particle containing platinum and tin uniformly dispersed on an alumina support was prepared following the procedure outlined in Example I. An impregnation solution containing cobaltous chloride and isopropanol was contacted with the platinum- and tin-containing spherical particle. After the cobalt impregnation, the catalyst was subjected to the identical finishing conditions as those used in Example VII.

The resulting catalyst was found to contain 0.39 wt. % uniformly dispersed platinum, 0.3 wt. % uniformly dispersed tin, and 0.22 wt. % surface-impregnated cobalt.

Figure 5:
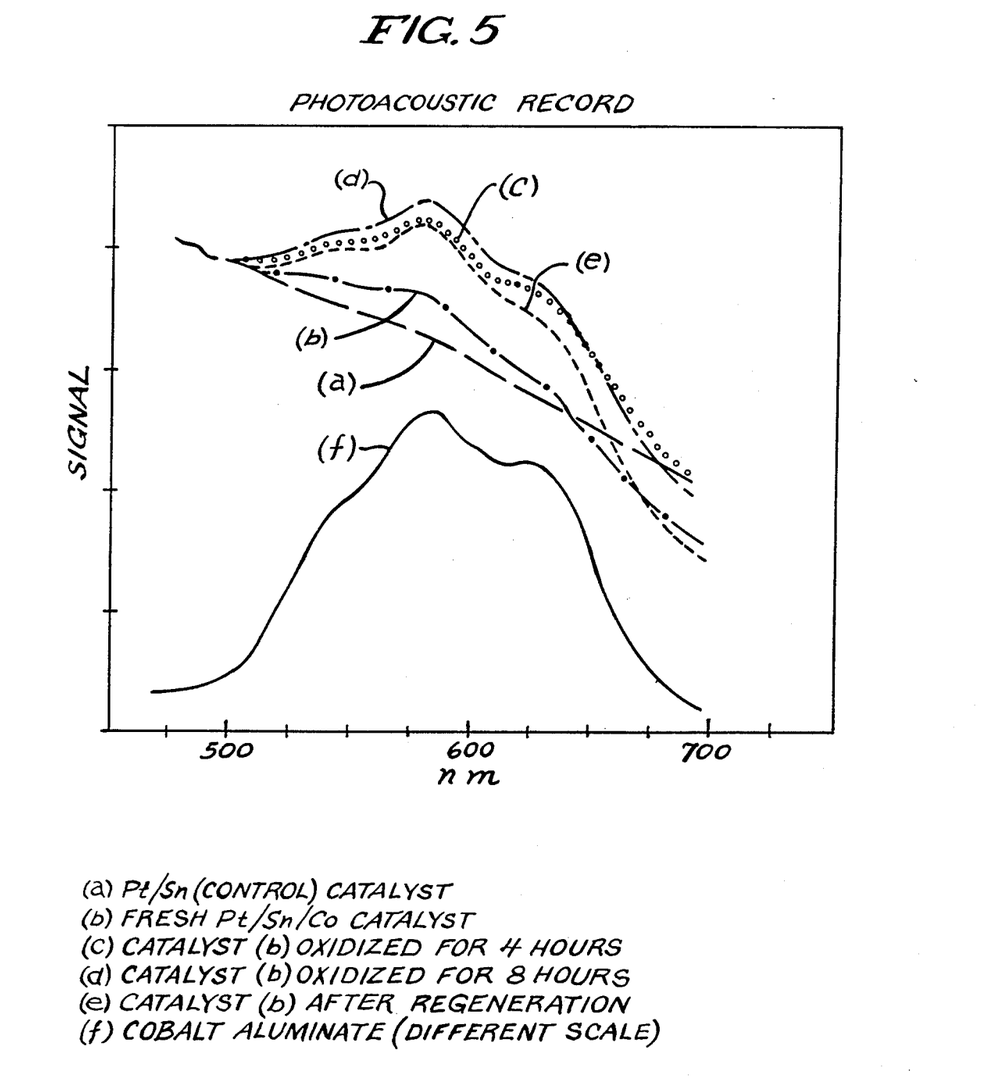
FIG. 5 shows the results of photoacoustic spectroscopy testing of several catalyst samples for the presence of cobalt aluminate. The absorbance peak at 500–700 nm is indicative of the quantity of cobalt aluminate.

The above catalyst was subjected to further oxidation steps and to regeneration to test for formation of cobalt aluminate. The following were tested by photoacoustic spectroscopy for the presence of cobalt aluminate:

(a) Pt/Sn-containing spherical particle before cobalt impregnation (control): designated as Catalyst J in Example XIV.
(b) Fresh Pt/Sn/surface-Co catalyst as described above before further oxidation.
(c) Catalyst (b) oxidized for 4 hours at 650° C.
(d) Catalyst (b) oxidized for 8 hours at 650° C.
(e) Catalyst (b) subjected to laboratory scale reforming as described in Example III and regenerated to restore activity and selectivity.
(f) Cobalt aluminate (different scale) for comparison.

The results of photoacoustic spectroscopy testing of Catalysts (a)–(e) are shown in FIG. 5. The absorbance peak at 500–700 nm is indicative of the quantity of cobalt aluminate. The results show that there is some cobalt aluminate present even in the fresh Pt/Sn/surface-Co catalyst. Catalyst regeneration results in the formation of additional cobalt aluminate. Most significantly, the proportion of cobalt present as cobalt aluminate increases with the extent of oxidation. The relevant proportions in this example are estimated as follows with an accuracy of ±2%:

(b) Fresh catalyst: 31%.
(c) Catalyst (b) oxidized for 4 hours at 650° C: 46%.
(d) Catalyst (b) oxidized for 8 hours at 650° C: 54%.

EXAMPLE XIV:

Catalyst K was prepared by subjecting the catalyst described in the second paragraph of Example XIII to laboratory-scale reforming, as in Example III, and regenerating nine times to restore activity and stability. This procedure assured that, considering the results of Example XIII, the surface-impregnated cobalt would be substantially converted to cobalt aluminate.

Catalysts J and K were performance-tested in the manner as set forth in Example III. Reaction-zone pressure was substantially higher, however, at about 860 kPa; thus, yields would be somewhat lower than previous Examples and results are not directly comparable to, e.g., Catalyst G. Comparative results for Catalysts J and K were:

|  | J | K |
|---|---|---|
| Start-of-run temp. @ 0.3 BPP, °F. | 972 | 965 |
| Deactivation rate, °F./BPP | 29 | 29 |
| Avg. $C_5$ + liq. vol. % yield | 77.9 | 78.8 |

Surprisingly, the catalyst after nine regenerations containing surface-impregnated cobalt aluminate still showed a significant activity and yield advantage and equivalent stability to a fresh catalyst not containing cobalt.

What is claimed is:

1. A process for the catalytic reforming of naphtha charge stock comprising contacting the naphtha and hydrogen at reforming conditions with a catalytic composite comprising a uniformly dispersed platinum component, a uniformly dispersed Group IVA metal component, a surface-impregnated metal or metal-containing component selected from the group consisting of rhodium, ruthenium, cobalt, nickel, or iridium and a halogen component on a refractory support having a nominal diameter of at least 650 microns.

2. The process of claim 1 further characterized in that the catalyst comprises, on an elemental basis, from about 0.05 to about 1 wt. % platinum, from about 0.05 to about 1 wt. % surface-impregnated metal or metal-containing component, from about 0.1 to about 2 wt. % Group IVA metal, and from about 0.5 to about 1.5 wt. % chlorine on a support having a nominal diameter of about 1500 microns.

3. The process of claim 1 further characterized in that the Group IVA metal comprises tin.

4. The process of claim 1 further characterized in that the Group IVA metal comprises germanium.

5. The process of claim 1 further characterized in that the Group IVA metal comprises lead.

6. The process of claim 1 further characterized in that the surface-impregnated metal-containing component comprises cobalt aluminate.

7. The process of claim 1 further characterized in that the sulfur content of the naphtha feedstock is less than 0.1 wt. ppm.

8. The process of claim 1 further characterized in that the halogen component comprises a chlorine component.

9. The process of claim 1 further characterized in that the reforming conditions include a pressure of from about 345 to about 862 kPa (ga).

* * * * *